United States Patent [19]

Fradin

[11] Patent Number: 4,594,253
[45] Date of Patent: Jun. 10, 1986

[54] METHOD FOR MINCING AND PREPACKAGING MINCED MEAT UNDER CONTROLLED ATMOSPHERE AND TEMPERATURE

[76] Inventor: Maurice Fradin, Résidence le Jean Bart - 19 Esplande de la Mer, 85160 Saint Jean de Monts, France

[21] Appl. No.: 601,776

[22] Filed: Mar. 21, 1984

[51] Int. Cl.⁴ .................... A22C 21/00; A22C 21/04; B65B 31/02
[52] U.S. Cl. ........................... 426/393; 17/45; 17/47; 62/60; 62/63; 62/380; 62/384; 426/414; 426/418; 426/524; 426/513; 426/518
[58] Field of Search ............... 62/320, 380, 384, 379, 62/63, 60; 17/45, 47, 20; 426/393, 397, 399, 524, 418, 419, 413, 414, 513, 518, 324

[56] References Cited

U.S. PATENT DOCUMENTS

| | | | |
|---|---|---|---|
| 1,798,781 | 3/1931 | Brooks | 426/419 |
| 1,924,059 | 8/1933 | Hoskins | 426/393 |
| 2,337,600 | 12/1943 | Harris | 426/419 |
| 2,583,697 | 1/1952 | Hendry et al. | 426/393 |
| 2,602,185 | 7/1952 | Johnson | 17/11 |
| 2,855,314 | 10/1958 | MckMartin | 426/399 |
| 3,032,415 | 5/1962 | Werblud | 426/524 |
| 3,035,886 | 5/1962 | Hickey | 426/399 |
| 3,214,928 | 11/1965 | Oberdorfer | 62/380 |
| 3,254,506 | 6/1966 | Braeking | 62/379 |
| 3,266,905 | 8/1966 | Baker et al. | 426/397 |
| 3,304,732 | 2/1967 | Rubin | 62/379 |
| 3,397,423 | 8/1968 | Burch | 17/47 |
| 3,435,632 | 4/1969 | Fallin | 62/380 |
| 3,468,135 | 9/1969 | Doll et al. | 62/63 |
| 3,487,769 | 1/1970 | Dixon | 426/419 |
| 3,492,831 | 2/1970 | Maurer et al. | 426/524 |
| 3,557,567 | 1/1971 | Brennan | 62/60 |
| 3,627,393 | 12/1971 | Hickson et al. | 426/419 |
| 3,685,308 | 8/1972 | Lundquist | 62/60 |
| 3,703,744 | 11/1972 | Dillon | 17/47 |
| 3,769,807 | 11/1973 | Foster | 62/380 |
| 3,807,187 | 4/1974 | Vorel | 62/384 |
| 3,851,080 | 11/1974 | Lugg | 426/418 |
| 3,930,040 | 12/1975 | Woodruff | 426/418 |
| 3,932,155 | 1/1976 | Pietrucha et al. | 62/63 |
| 4,152,464 | 5/1979 | Brody et al. | 426/399 |
| 4,325,221 | 4/1982 | Grewar | 62/63 |
| 4,372,130 | 2/1983 | Klee et al. | 62/384 |
| 4,448,029 | 5/1984 | Keller | 62/380 |

FOREIGN PATENT DOCUMENTS

| | | | |
|---|---|---|---|
| 37350 | 10/1981 | European Pat. Off. | 17/45 |
| 1361640 | 7/1974 | United Kingdom | 426/399 |
| 2089191 | 6/1982 | United Kingdom | 426/397 |

OTHER PUBLICATIONS

Nat'l Provisioner, 1/31/79, p. 7.
Refrigerating Engineering, 5/49, p. 453.

Primary Examiner—Steven L. Weinstein
Attorney, Agent, or Firm—William A. Drucker

[57] ABSTRACT

A method for the continuous treatment of poultry carcasses. The poultry carcasses are successively singed, cooled, deboned, minced, shaped and packaged. Prior to singeing, the carcasses are injected with carbon dioxide snow to prevent the development of germs during singeing. The mincing, shaping and packaging steps are carried out in an enclosure in which carbon dioxide snow is introduced so that the temperature is maintained at about 0° to −4° C.

3 Claims, 2 Drawing Figures

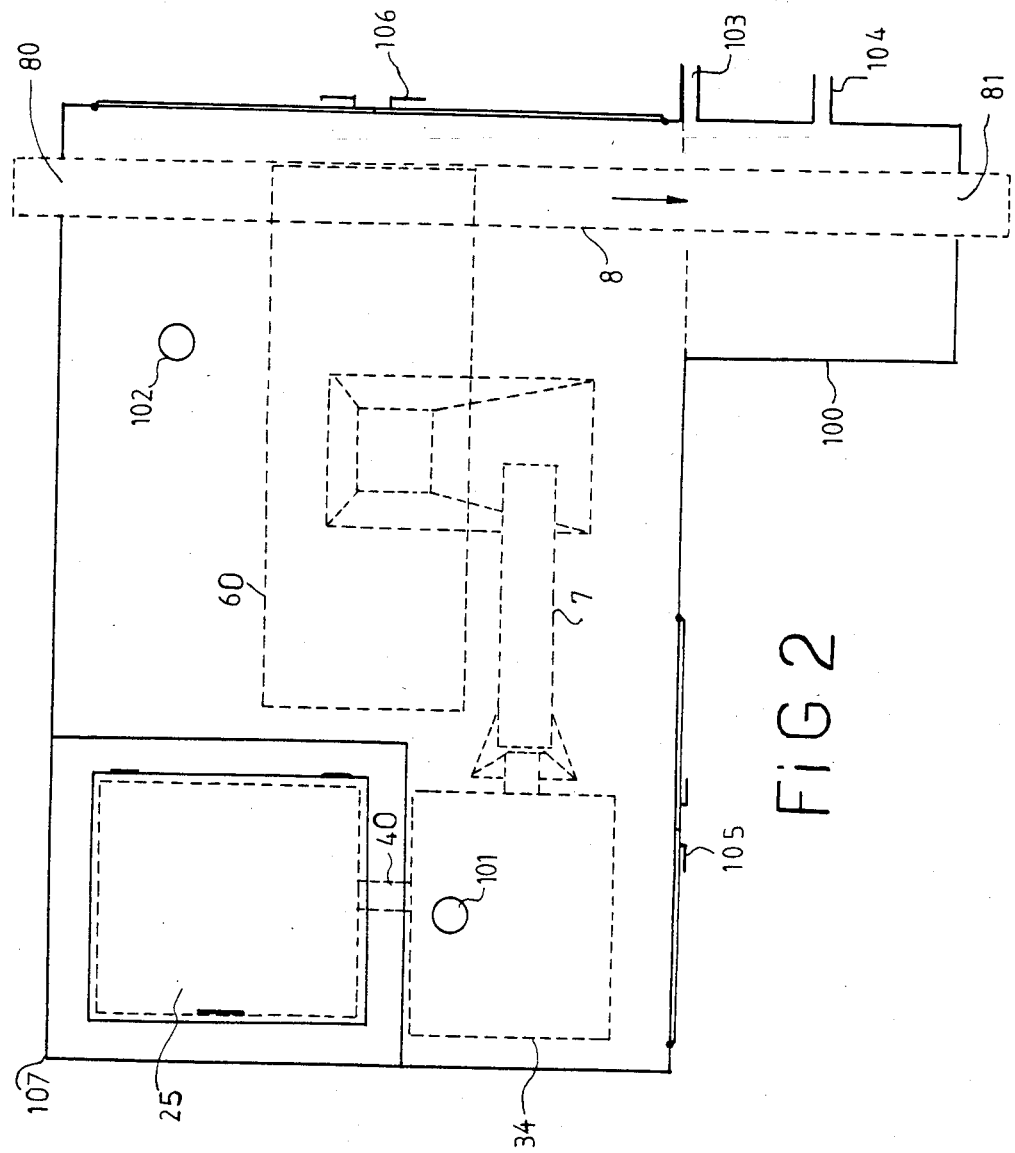

METHOD FOR MINCING AND PREPACKAGING MINCED MEAT UNDER CONTROLLED ATMOSPHERE AND TEMPERATURE

The invention relates to the mincing of meat and to the prepackaging of the minced meat, in particular, in containers that are closed by a sheet of plastic or other material. The products thus pre-packed (beefsteak, poultry meat) are either to be delivered as is, on leaving the installation, or to be cooled to a lower temperature in another installation, which does not form part of the invention, for delivery in a frozen state.

The mincing of meat and the pre-packaging of the minced meat, in particular minced beefsteak obtained from pieces of meat supplied in continuous fashion or in batches raises, when large quantities of meat are involved, the problem of suitable cooling of the meat while it is being minced and shaped, the heating caused by the mincing operations encouraging the development of germs and secretions having a tendency to produce if the minced meat is not kept at a temperature close to 0° or slightly lower.

Various solutions have been suggested to overcome these disadvantages and, in particular, according to French Pat. No. 2 428 292, the circulation of a refrigerant, which could be carbonic gas or any other refrigerant with comparable properties, in the mincing mechanism or under the conveyor mat, with the disadvantage, over and above the risk of causing the minced meat to stick to the wall of the conveyor device, of not eliminating the air in the room, and therefore of not preventing oxidation of the meat. In addition to the fact that it necessitates a cooling installation inside the room, this process involves a relatively high consumption of the refrigerant when there are for example 300 or 400 kgs of meat per hour to be treated and does not in practice enable the atmosphere to be kept germ-free and the temperature to be correctly controlled.

Furthermore, after the pre-packaging operation, it is necessary in practice to inject into the container an appropriate gas or mixture of gases for conditioning, for example a mixture of oxygen, carbonic anhydride and nitrogen, which ensures the preservation of the organoleptic properties of the meat. This supplementary operation is obviously onerous.

It is an object of the invention to simplify the process and to make it less onerous, without damaging the quality of the final product. The invention is a process principally characterised in that all of the operations mentioned above, including the pre-packaging, are carried out in one or more rooms forming a sealed whole into which a refrigerant is introduced, preferably carbonic anhydride at a low temperature and, in addition, preferably a supplementary gas or mixture of gases for conditioning, or the gases which constitute it, a control being provided for maintaining, in the different regions of the whole installation, an atmosphere with a composition and temperature appropriate to the operations carried out in them, the pre-packaging operation thus being carried out in direct contact with the carbon dioxide or other refrigerant gas, preferably mixed with the supplementary gas or mixture of gases for conditioning, without it being necessary to inject it into the packages after this operation.

Another object of the invention is an installation for carrying out the above process.

According to a preferred method of execution, the grinders or mincers and the device for shaping and placing in open containers are housed in a main room at one end of which the meat is introduced and at the other end of which the open containers are introduced, a controlled inlet for the pressurised refrigerating product at a low temperature being provided at the level of the grinders or mincers and a controlled outlet at the level of the shaping device, while the pre-packaging device can be housed in an auxiliary room adjoining the main room, at the point where the open containers leave the main room, a controlled inlet and outlet for the gas or supplementary gas mixture for conditioning being advantageously provided in this auxiliary room or in the vicinity of it.

Another object of the invention is the application of the above process to the continuous treatment of poultry carcasses for the manufacture of minced meat.

Up until now, the treatment of poultry carcasses has not been carried out continuously on industrial scale using mechanical means.

One of the problems raised by such treatment is the high proportion of germs in the skin of the poultry and inside its carcass, and the considerable risk of appreciable development of these germs during treatment. The invention proposes to overcome this disadvantage by implementing a continuous treatment of the carcasses while they are still warm, including, before the final step of mincing and pre-packaging carried out according to the above process and the deboning step which necessarily precedes it, supplementary steps for preparation of these carcasses with a view to cutting out all risk of the development of germs.

One of the objects of the invention is therefore a process characterised in that it includes the following operations, carried out successively, continuously and without interruption, with poultry carcasses still warm from the abbatoir:

a. a first operation of injecting carbonic acid snow or other refrigerant inside the carcass;
 b. a second operation of singeing, carried out inside a tunnel through which the carcasses pass;
 c. a third operation of refrigeration;
 d. a fourth operation of de-boning;
 e. a fifth operation of mincing and pre-packaging in a controlled atmosphere containing carbonic anhydride or refrigerant at a low temperature.

According to a preferred method of carrying out the process, the first three operations are carried out inside a room through which a current of air passes which facilitates evacuation of the heat from the singeing and of carbon dioxide.

Another object of the invention is an installation for carrying out the above process, principally characterised by a room with ventilating shafts and containing a machine which has means for injecting carbonic acid snow or other refrigerant, a tunnel for singeing, a refrigerating tunnel, and a conveyor ensuring the passage of the carcasses, attached by the feet, into the room.

Other details, as also the advantages of the invention will be shown clearly in the light of the following detailed description.

BRIEF DESCRIPTION OF THE DRAWINGS

In the attached drawing:

FIG. 2 represents, seen from above, the part of the installation that corresponds with the fifth step.

Figure 1:
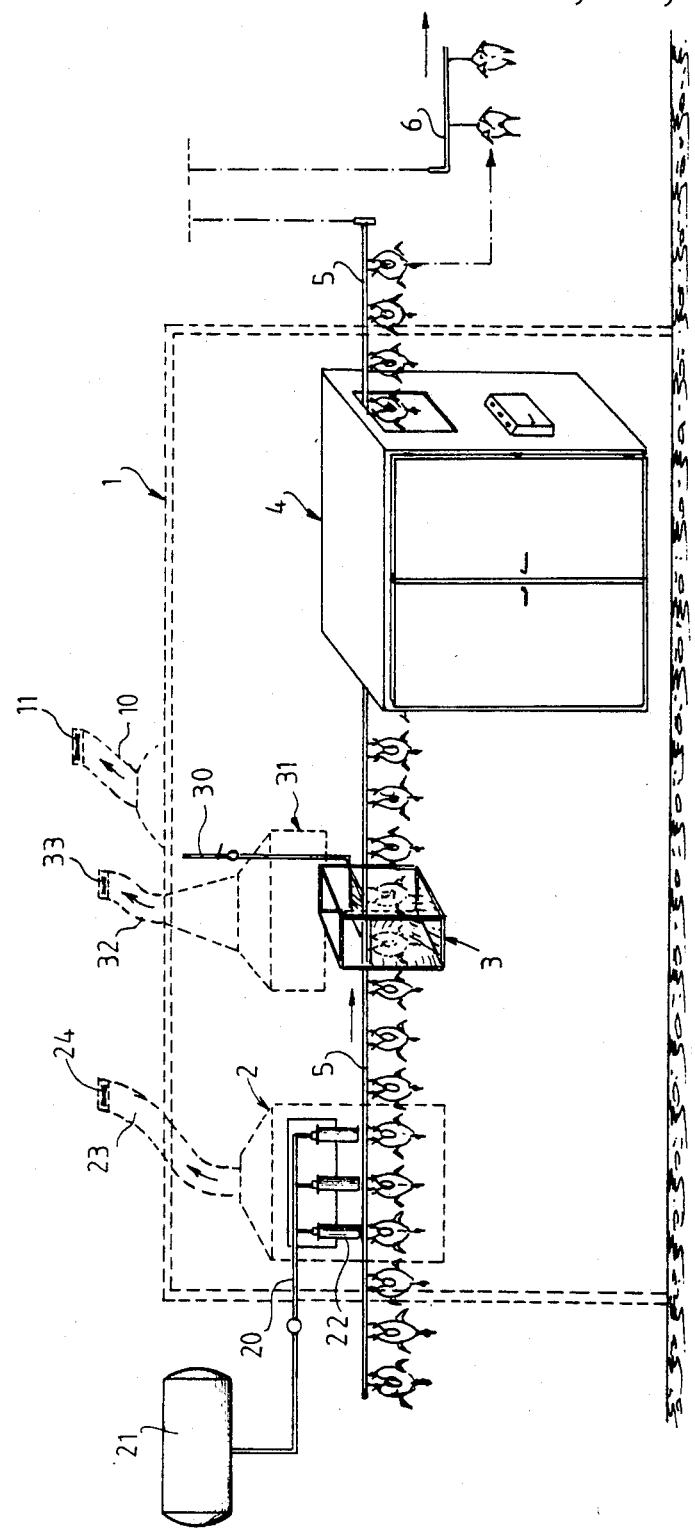
FIG. 1 represents the part of the installation for treatment of poultry carcasses according to the invention, which corresponds with the first three steps of the process

A room 1 contains a machine 2 for injecting carbon dioxide, a singeing tunnel 3 and a refrigeration tunnel 4.

The warm poultry carcasses, that are coming from the abbatoir, after evisceration, rapidly pass through the room 1 and the mechanisms 2 to 4 by means of a conveyor 5, of a known type, where they are hung attached by the feet. On leaving the room, they are transferred into a manual or automatic de-boning unit. This sort of unit is known and is not an object of the present patent. At the outlet, the pieces of meat are immediately introduced into the installation for mincing and pre-packaging shown in FIG. 2.

The machine 2 has one or more injection ramps which comprise, in the known way, inlet pipes 20 for carbonic acid snow from a reservoir 21, to which the injection mechanisms 22 are connected, mechanisms 20 which have an injection pipe that comes down and penetrates the poultry.

The machine 2 is connected to the outside of the room by an extraction duct 23 for gases which is provided with a mechanical extractor 24. This mechanical extractor creates a low pressure inside the machine with resultant evacuation of the liberated carbonic anhydride.

The tunnel 3 has burners connected to a supply system 30 and covered by a hood 31 connected with the outside of the room by a duct 32 with a mechanical extractor. This device ensures rapid evacuation of the gases produced by the burners. The singeing is rapid and superficial.

It is useful for the room to have a general ventilation shaft 10 with a mechanical extractor. The injection of carbonic acid snow into the interior of the carcass prevents the development of any germs during the singeing operation. This singeing operation sterilises the skin of the poultry, but would risk warming the carcass, therefore stimulating the growth of internal germs, if prior injection of carbonic acid snow had not taken place. Once the carcasses have been singed they are introduced into a low temperature zone, which prevents them leaving the room at too high a temperature which would considerably increase the risk of the development of germs during de-boning.

The mincing and pre-packaging installation includes, housed in a gas-tight main room 107, for example two mincing machines 25 and 34 interconnected by one or more devices 40 for transferring the minced meat, and a machine 60 for shaping the minced meat into beefsteaks or similar, connected to the last mincer 34 by a mechanism 7 for transferring the minced meat. The apparatus 106 introduces the quantites of minced and shaped meat corresponding to beefsteaks into open containers brought by a conveyor 8 which at 80 goes through a window made in the wall of the room and so designed that it is suitably gas-tight. On leaving the apparatus 60, the conveyor 8 passes through a secondary room 100 which contains a pre-packaging machine, not shown: this machine closes the open containers with a protective sheet of plastic material that is gas-tight and the containers leave the room 100, on the conveyor 8, through a window 81 made in the wall of this room, the window being so designed that it is suitably gas-tight.

Finally, all the operations of grinding the meat, shaping the meat and pre-packaging are carried out inside a sealed streamlined assembly, therefore with the meat constantly in contact with the controlled atmosphere reigning inside. This atmosphere is kept at a temperature lower than 0° by a few degrees (for example, between 0° and −4° C.) and consisting preferably of carbon dioxide and, preferably of a gas or mixture of gases for supplementary conditioning.

For this purpose, carbonic acid snow, or any other refrigerant with comparable properties, is introduced into the room 107 not shown and leading to an orifice 101 made in the upper wall of the room, for example above the second mincer 34. An evacuation duct leaves from another orifice 102 made in an appropriate position of the upper wall of the room, in the area occupied by the machine 60 and also has a valve, not shown. A third duct 103 permits, when necessary, the introduction of an appropriate gas mixture for conditioning in the secondary room 100 which houses the pre-packaging machine. This duct is preferably situated near the communication area between the two rooms. An evacuation duct 104 is also provided. The ducts 103 and 104 have an inflow control valve and, where necessary, an analyser, not shown, may enable the composition of the atmosphere in the room 100 to be known, with a view to carrying out adjustments.

It must be understood that the apparatuses constituting the installation: mincers 25 and 34, shaping machine 6 and pre-packaging machine are commonplace and that the installation is principally characterised by the fact that all these apparatuses are entirely surrounded, during operation, by the same atmosphere refrigerated by means of a free circulation of carbon dioxide the temperature and composition of which is well monitored.

Carbon dioxide is an everyday industrial product, easy to distribute from pressurised bottles containing liquid carbon dioxide, the temperature of the snow which forms as soon as the carbon dioxide leaves the bottle (−79° C.), although very much lower than the desired temperature for the room, is compatible with the final result sought, that is a suitable adjustment of the input and outlet valves makes it possible to achieve the desired temperature. The working components of the apparatuses and the meat itself will permanently be placed in a circulation of carbon dioxide, preferably with a gas or mixture of conditioning gases added. This circulation ensures a perfectly effective cooling of the meat at all its conditioning stages, even for a meat supply rate of several hundreds of kilos per hour, while the atmospheric air will be eliminated and replaced by a gas, free of bacteria and with the required properties.

Since the pre-packaging operation is also carried out in the presence of carbon dioxide and eventually of the supplementary gas mixture, the meat in the open containers, while these are being closed by means of a sheet of plastic material, will automatically come into contact with an atmosphere conducive to the preservation of its organoleptic qualities, without the necessity, as is currently the case, of subsequently introducing the appropriate gas into the sealed containers. If the auxiliary gas mixture contains a refrigerant, this will obviously contribute to the refrigeration of the main room.

In the case where it proves preferable to achieve different temperatures or compositions of the gas mixture in certain parts of the global volume of the rooms, for example in the secondary room, a partitioning could be provided and the partitions have appropriately sized openings to allow measured circulation of the carbon dioxide and of the supplementary gas mixture.

The means, known in themselves, for introducing the meat into the first mincer, either continuously or in batches, have not been shown. Obviously doors such as 105-106, are provided, for the cleaning and maintenance of the apparatuses.

It goes without saying that the installations described are in no way limited. The one shown in FIG. 2 could equally well be used for poultry meat as for beefsteak.

I claim:

1. A process for continuous treatment of poultry carcasses for the manufacture of minced meat, comprising the steps of:
   (i) injecting carbon dioxide snow inside the warm carcasses coming from the abattoir, after evisceration thereof;
   (ii) immediately performing a singeing operation on the carcasses inside which carbon dioxide snow has been injected;
   (iii) cooling the singed carcasses;
   (iv) de-boning the singed and cooled carcasses;
   (v) mincing the de-boned carcasses;
   (vi) shaping the minced meat and packaging it into containers,
   (vii) the mincing, shaping and packaging steps being carried out in a substantially thermally insulated and gas-tight enclosure within which the temperature is maintained at about 0° to −4° C. by introducing controlled quantities of carbon dioxide snow inside the enclosure while evacuating controlled quantities of the air and other gases contained within the enclosure.

2. A process as claimed in claim 1, wherein controlled quantities of an oxygen containing gas mixture are further introduced in the said enclosure in a region thereof where the said packaging step is carried out.

3. A process as claimed in claim 1, wherein the i, ii and iii are carried out inside a ventilated enclosure.

* * * * *